(12) United States Patent
Hu

(10) Patent No.: US 10,294,355 B2
(45) Date of Patent: May 21, 2019

(54) VINYL ACETATE-ETHYLENE/ACRYLIC POLYMER EMULSIONS AND PRODUCTS AND METHODS RELATING THERETO

(71) Applicant: Avery Dennison Corporation, Glendale, CA (US)

(72) Inventor: Xiaochuan Hu, State College, PA (US)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 14/882,077

(22) Filed: Oct. 13, 2015

(65) Prior Publication Data

US 2016/0102195 A1 Apr. 14, 2016

Related U.S. Application Data

(60) Provisional application No. 62/063,121, filed on Oct. 13, 2014, provisional application No. 62/155,725, filed on May 1, 2015.

(51) Int. Cl.
| | | |
|---|---|---|
| C08L 23/08 | (2006.01) | |
| C08L 31/04 | (2006.01) | |
| C08L 33/08 | (2006.01) | |
| C09J 133/08 | (2006.01) | |
| C09J 123/08 | (2006.01) | |
| C09J 131/04 | (2006.01) | |
| C08F 220/18 | (2006.01) | |
| C08F 255/02 | (2006.01) | |

(52) U.S. Cl.
CPC ........ C08L 23/0853 (2013.01); C08F 220/18 (2013.01); C08F 255/026 (2013.01); C08L 31/04 (2013.01); C08L 33/08 (2013.01); C09J 123/0853 (2013.01); C09J 131/04 (2013.01); C09J 133/08 (2013.01)

(58) Field of Classification Search
CPC .......... C08L 23/08; C08L 33/08; C08L 31/04; C09J 133/08; C09J 123/08; C09J 131/04
USPC ....................................................... 524/428
See application file for complete search history.

(56) References Cited

U.S. PATENT DOCUMENTS

| | | | |
|---|---|---|---|
| 5,391,608 A | 2/1995 | Mudge et al. | |
| 6,319,978 B1 | 11/2001 | Daniels et al. | |
| 6,458,501 B1 | 10/2002 | Cheng et al. | |
| 6,660,814 B1 | 12/2003 | Kroner et al. | |
| 6,875,799 B2 | 4/2005 | Nyhus et al. | |
| 7,067,578 B2 | 6/2006 | Massillon | |
| 8,580,873 B2* | 11/2013 | Hyman | C04B 26/06 524/2 |
| 2007/0225421 A1 | 9/2007 | Maki et al. | |
| 2009/0012215 A1* | 1/2009 | Wada | B32B 27/18 524/91 |
| 2010/0009108 A1 | 1/2010 | Shih | |
| 2010/0294430 A1* | 11/2010 | Hyman | C04B 26/06 156/332 |
| 2011/0247746 A1* | 10/2011 | Schumacher | B31F 1/2809 156/210 |
| 2012/0009379 A1* | 1/2012 | Muller | C08F 218/08 428/96 |
| 2012/0077030 A1 | 3/2012 | Gerst et al. | |
| 2013/0202885 A1* | 8/2013 | Dodge | C09J 4/06 428/355 AC |
| 2013/0338299 A1 | 12/2013 | Belmonte Rodrigues de Castro et al. | |

FOREIGN PATENT DOCUMENTS

| | | |
|---|---|---|
| EP | 0381122 | 12/1998 |
| JP | 2011/231258 | 11/2011 |
| WO | 2006/022147 | 3/2006 |
| WO | WO 2009/009216 | * 1/2009 |
| WO | WO 2012/082141 | * 6/2012 |
| WO | 2015/119873 | 8/2015 |
| WO | 2015/160939 | 10/2015 |

OTHER PUBLICATIONS

International Search Report and Written Opinion dated Jan. 12, 2016 issued in corresponding International Application No. PCT/US2015/055343 filed Oct. 13, 2015.
Odian, Principles of Polymerization, John Wiley & Sons: New York, 1991, pp. 302-303, 336-339, 352.
International Preliminary Report on Patentability dated Apr. 18, 2017 issued in corresponding International Application No. PCT/US2015/055343 filed Oct. 13, 2015.

* cited by examiner

Primary Examiner — Deve E Valdez
(74) Attorney, Agent, or Firm — Avery Dennison Corporation (57) ABSTRACT

Methods of producing hybrid polymer emulsions by incorporating a vinyl acetate-ethylene copolymer dispersion as the seed for subsequent polymerization of an acrylic and/or methacrylic monomer mixture are described. In certain embodiments, new particle formation is observed. Also described are the resulting polymeric products. And hybrid polymer emulsions formed from the methods with pressure sensitive adhesion performance are also described.

64 Claims, 6 Drawing Sheets

VINYL ACETATE-ETHYLENE/ACRYLIC POLYMER EMULSIONS AND PRODUCTS AND METHODS RELATING THERETO

CROSS-REFERENCE TO RELATED APPLICATIONS

The present application claims the benefit of U.S. Provisional Patent Application Nos. 62/063,121 filed Oct. 13, 2014 and 62/155,725 filed May 1, 2015, both of which are incorporated herein by reference in their entireties.

FIELD

The present subject matter relates to the use of vinyl acetate-ethylene (VAE) copolymer dispersions which are used as seed components for subsequent emulsion polymerization reactions with unsaturated monomers, and particularly unsaturated acrylate and methacrylate monomers.

BACKGROUND

Polymer emulsions have been extensively used in the coating and adhesive industry because they are more environmentally friendly than their solvent counterparts. Meanwhile, there is also increasing interest in developing hybrid polymeric materials based upon combinations of different polymers because the resulting materials may exhibit superior properties as compared to the properties of their individual component polymers.

In general, latex particles made from sequential processing steps may exhibit a wide range of morphologies. The particular morphology and/or structure achieved are the result of a number of complex interactions between the thermodynamic and kinetic aspects of the emulsion polymerization process.

Significant efforts have been made over the decades to balance the adhesion-cohesion in waterborne pressure sensitive adhesives with few successes. Specifically, the conventional approaches are not sufficient to expand the "classical behavior" of a waterborne pressure sensitive adhesive where the adhesion performance is improved at the expense of cohesion, or vice versa.

Therefore, a need remains for new polymer emulsions using a particular seed component for polymerization, and particularly for polymerization of acrylic and methacrylic monomers. A need also remains for new polymerization strategies using the polymer emulsions.

SUMMARY

The difficulties and drawbacks associated with previous approaches are addressed in the present subject matter as follows.

In one aspect, the present subject matter provides a process for producing a hybrid polymer emulsion. The process comprises providing a vinyl acetate-ethylene copolymer dispersion as a seed. The process also comprises providing a monomer feed. And the process also comprises providing an initiator. The process additionally comprises combining the vinyl acetate-ethylene copolymer dispersion, the monomer feed, and the initiator to form an emulsion. The monomer mixture comprises at least 5% by weight based on the total polymer weight.

In another aspect, the present subject matter provides a hybrid polymer emulsion produced by the noted process.

In still another aspect, the present subject matter provides a hybrid polymer emulsion prepared by incorporating a vinyl acetate-ethylene copolymer dispersion as a seed for subsequent emulsion polymerization of an acrylic and/or methacrylic monomer mixture.

In yet additional aspects, the present subject matter provides an emulsion pressure sensitive adhesive prepared by the previously noted process.

In still a further aspect, the present subject matter provides a pressure sensitive adhesive comprising a hybrid polymer emulsion as described herein.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

The present subject matter provides a novel and useful preparation of a hybrid polymer emulsion with vinyl acetate-ethylene copolymer dispersions as the seed for subsequent polymerization of acrylic and/or methacrylic monomers. As used herein, the term "hybrid polymer emulsion" refers to latex particles including two or more different polymers and/or copolymers. Without being bound to any particular theory, it is believed that the sequential polymerization procedure of the present subject matter causes the hybrid polymer particles to form cores of vinyl acetate-ethylene copolymer with a shell surrounding the core, the shell being formed by the reaction products of the acrylic and/or methacrylic monomer mixture. However, latex particles made from sequential processing steps may have a wide range of morphologies. The particular structure achieved is the result of a number of complex interactions between the thermodynamic and kinetic aspects of the emulsion polymerization process.

In one embodiment, the present subject matter includes a process for producing a hybrid polymer emulsion by providing a vinyl acetate-ethylene copolymer dispersion as a seed. The process also comprises providing a monomer feed. The process also comprises providing an initiator. In certain embodiments, the monomer feed and the initiator are concurrently combined. The process also comprises combining the vinyl acetate-ethylene copolymer dispersion, the monomer feed, and the initiator to form an emulsion such that the monomer mixture comprises at least 5% by weight of the total polymer weight. In certain versions, the monomer feed and the initiator are concurrently combined. In certain versions, the monomer feed can also comprise deionized water and a surfactant.

In one embodiment, the present subject matter includes a process for producing a hybrid polymer emulsion by incorporating a seed comprised of a vinyl acetate-ethylene copolymer at 7.5% by weight as measured by the total polymer weight. Subsequent emulsion copolymerization of a (meth) acrylic monomer mixture, wherein the monomers used in the process are comprised of 92.5% by weight as measured by the total polymer weight, produces a hybrid polymer emulsion in accordance with the present subject matter. As used herein, the term "(meth)acrylate" refers to either an acrylate or a methacrylate. For example, the term "alkyl (meth)acrylates" refers to the group of chemicals that includes both alkyl acrylates and alkyl methacrylates.

In another embodiment, the present subject matter includes a process for producing a hybrid polymer emulsion by incorporating a seed comprised of a vinyl acetate-ethylene copolymer at 20% by weight as measured by the total polymer weight. Subsequent emulsion copolymerization of a (meth)acrylic monomer mixture, wherein the monomers used in the process are comprised of 80% by weight as measured by the total polymer weight, produces a hybrid polymer emulsion in accordance with the present subject matter.

In still another embodiment, the present subject matter includes a process for producing a hybrid polymer emulsion by incorporating a seed comprised of a vinyl acetate-ethylene copolymer at 50% by weight as measured by the total polymer weight. Subsequent emulsion copolymerization of a (meth)acrylic monomer mixture, wherein the monomers used in the process are comprised of 50% by weight as measured by the total polymer weight, produces a hybrid polymer emulsion in accordance with the present subject matter.

In still another embodiment, the present subject matter includes a process for producing a hybrid polymer emulsion by incorporating a seed comprised of a vinyl acetate-ethylene copolymer at 75% by weight as measured by the total polymer weight. Subsequent emulsion copolymerization of a (meth)acrylic monomer mixture, wherein the monomers used in the process are comprised of 25% by weight as measured by the total polymer weight, produces a hybrid polymer emulsion in accordance with the present subject matter.

In still another embodiment, the present subject matter includes a process for producing a hybrid polymer emulsion by incorporating a seed comprised of a vinyl acetate-ethylene copolymer at 85% by weight as measured by the total polymer weight. Subsequent emulsion copolymerization of a (meth)acrylic monomer mixture, wherein the monomers used in the process are comprised of 15% by weight as measured by the total polymer weight, produces a hybrid polymer emulsion in accordance with the present subject matter.

The polymer emulsions of the present subject matter are hybrid polymer emulsions that are the reaction product of a vinyl acetate-ethylene copolymer dispersion seed and a mixture of ethylenically unsaturated monomers. As used herein, the term "seed" refers to a particle in a polymer colloid that is the locus of subsequent polymerization. The term "monomer" encompasses monomers and oligomers as would be used in building a desired polymer. The term "copolymer dispersion" refers to a dispersion in which the dispersed phase includes a copolymer. The term "hybrid polymer" refers to a polymer that includes two or more different types of polymers.

The hybrid polymer emulsions of the present subject matter are prepared by incorporating a vinyl acetate-ethylene copolymer dispersion as the seed followed by subsequent polymerization of a monomer and/or a monomer mixture. As used herein, monomer percentages and vinyl acetate-ethylene copolymer percentages are based on their weight percent of the total polymer weight. The total polymer weight is defined as the sum of the weight of vinyl acetate-ethylene copolymer and the weight of the polymerized monomer species.

In general, vinyl acetate-ethylene (VAE) copolymer dispersions are based on the copolymerization of vinyl acetate and ethylene, in which the vinyl acetate content can range between 60-95% and the ethylene content ranges between 5-40% of the total formulation. Without being bound by the definition above, vinyl acetate-ethylene copolymer dispersions with higher ethylene content can also be used as the seed for subsequent polymerization without departing from the scope of the present subject matter.

The amount of the vinyl acetate-ethylene copolymer can range from about 0.05% to about 95% of the total polymer weight. In particular embodiments, the vinyl acetate-ethylene copolymer comprises at least 10%, in other embodiments at least 20%, in other embodiments at least 50%, in other embodiments at least 75%, and in other embodiments at least 85% of the total polymer weight.

The vinyl acetate-ethylene copolymer dispersions can be stabilized with colloid systems and/or surfactant systems. Suitable vinyl acetate-ethylene copolymer dispersions that can be incorporated as the seed in the present subject matter for subsequent emulsion polymerization are commercially available from a variety of sources, such as Wacker Chemical Corporation, Arkema, Vinavil and Celanese, including but not limited to, VINNAPAS® Standard and VINNAPAS® Plus series from Wacker, ECOVAE® series from Celanese and ENCOR® series from Arkema.

The hybrid polymer emulsions of the present subject matter may be prepared by polymerizing a polymerizable monomer mixture. As described in detail herein, the monomer mixture may be combined with other components such as surfactants and stabilizers to create a polymerizable monomer feed and/or a pre-emulsion feed.

The monomer feed used in the present subject matter may contain, as copolymerized unit(s), at least one and in many embodiments at least two, copolymerizable mono-ethylenically unsaturated monomer(s) including, but not limited to, for example, methyl acrylate, methyl methacrylate, ethyl acrylate, ethyl methacrylate, butyl acrylate, butyl methacrylate, propyl acrylate, propyl methacrylate, 2-ethylhexyl acrylate, 2-ethylhexyl methacrylate, lauryl acrylate, lauryl methacrylate, iso-octyl acrylate, iso-octyl methacrylate, iso-decyl acrylate, iso-decyl methacrylate, stearyl acrylate, stearyl methacrylate, vinyl propionate, styrene, alkyl-substituted styrenes, vinyl acetate, vinyl chloride, N-vinyl pyrrolidone, and combinations thereof. In certain embodiments, the one or more monomer(s) may include various vinyl esters in addition to or instead of those noted above; and/or various vinyl monomer(s) in addition to or instead of those noted above.

The monomer feed may also contain an internal cross-linking agent. The term "internal cross-linking agent" includes polyfunctional compounds having at least two non-conjugated carbon-carbon double bonds per molecule. Examples of suitable internal cross-linking agents include, but are not limited to, allyl methacrylate, diallyl maleate, dially phthalate and multifunctional (meth)acrylates including 1,4-butanediol dimethacrylate, polyethylene glycol diacrylate, 1,6-hexanediol diacrylate, trimethylolpropane triacrylate, propylene glycol diacrylate and trimethylolpropane trimethacrylate.

The monomer feed may also comprise a polar monomer or blends of polar monomers. The term "polar" monomer includes, but is not limited to, organic acids, anhydride, amides, nitriles and alcohols. Suitable polar monomers include, but are not limited to, (meth)acrylic acid, crotonic acid, itaconic acid, fumaric acid, maleic acid, maleic anhydride, hydroxyethyl (meth)acrylate, aminoalkyl (meth)acrylate for example aminomethyl methacrylate, N-alkyl aminoalkyl (meth)acrylate for example N-methyl aminoethyl methacrylate, N,N-dialkyl aminoalkyl (meth)acrylate for example N,N-dimethyl aminoethyl methacrylate, ureido (meth)acrylate, (meth)acrylonitrile and (meth)acrylamide or mixtures thereof. As used herein and throughout the disclosure, the term "(meth)" followed by another term such as for example acrylate, acrylonitrile, or acrylamide, refers to both acrylate, acrylonitrile, or acrylamide and methacrylate, methacrylonitrile, and methacrylamide, respectively. The monomer feed may also include de-ionized water.

The amount of the monomer mixture can range from about 5% to about 99.95% of the total polymer weight. In particular embodiments, the amount of the monomer mixture comprises at least 5% of the total polymer weight.

In certain embodiments, the monomers are polymerized in the presence of a surfactant or a mixture of surfactants. The free radical polymerization techniques used to prepare the hybrid polymer emulsion of the present subject matter are well known in the art and so are not described herein. However, generally the methods involve providing a vinyl acetate-ethylene copolymer dispersion as a seed for subsequent emulsion polymerization of an acrylic and/or methacrylic monomer mixture. The method can also comprise adding one or more of methacrylic acid and/or acrylic acid to the monomer mixture.

Various surfactants may be used such as, for example, anionic and/or nonionic emulsifiers such as, alkali metal or ammonium salts of alkyl, aryl, or alkylaryl sulfates, sulfonates or phosphates; alkyl sulfonic acids; sulfosuccinate salts, fatty acids, polymerizable surfactants such as ethylenically unsaturated surfactant; and ethoxylated alcohols or phenols. The amount of the surfactants used is usually 0.1% to 6% by weight, based on the weight of monomer. The surfactant(s) may be administered with deionized water and/or other vehicles.

Suitable anionic surfactants include, but are not limited to, alkyl sulfates, alkyl ether sulfates, alkyl ether sulfonates, sulfate esters of an alkylphenoxy polyoxyethylene ethanol, alkyllauryl sulfonates, alkyl ether carboxylates, alkyl carbonates, octoxynol or nonoxynol phosphates, fatty acid amide polyoxyethylene sulfates, or mixtures thereof. Specific examples of such anionic surfactants include DISPONIL FES-77, a sodium lauryl ether sulfate by BASF; AEROSOL A-102, a disodium ethoxylated alcohol [$C_{10}$-$C_{12}$] half ester of sulfosuccinic acid marketed by Cytec Industries; and AEROSOL OT-75, a sodium dioctyl sulfosuccinate by Cytec Industries as well.

One or more nonionic surfactants may be used. Nonionic surfactants typically include a hydrophobic, long alkyl chain or an alkylated aryl group and hydrophilic chain comprising a certain number of ethoxy moieties. Examples of such nonionic surfactants that can be used include, but are not limited to, ethoxylated alkylphenols, ethoxylated fatty alcohols, linear or branched, ethylene oxide-propylene oxide block copolymers, ethoxylated esters of fatty acids, and mixtures thereof.

In addition, a colloidal stabilizer may also be used in the process to form the polymer emulsions of the present subject matter. A suitable stabilizer includes polyvinyl alcohol commercially available from a variety of sources such as Chang Chun Petrochemical Co., Ltd. of Taiwan, Kuraray America, Celanese and Sekisui, including but not limited to, Celvol® series from Celanese, Selvol® series from Sekisui, Poval® and Elvanol® series from Kuraray. The amount of stabilizers used usually ranges from 0.1% to 6% by weight, based on the weight of monomer. The stabilizer may be included in the initial reactor charge mixture and/or a pre-emulsion mixture.

An initiator is used to induce polymerization of the monomers. Initiators used in the present subject matter include peroxygen compounds such as persulfates of sodium, potassium or ammonium, hydrogen peroxide, t-butyl hydroperoxide, lauroyl peroxide, benzoyl peroxide and combinations thereof. Initiators used in the present subject matter can also include one or more of 2,2'-azobis-(2,4-dimethylvaleronitrile), 2,2'-azobis-(2-isobutyronitrile), 1,1'-azobis(cyclohexane-1-carbonitrile), 2,2'-azobis(4-methoxy-2,4-dimethyl valeronitrile), 2,2-azobis[N-(2-propenyl)-2-methylpropionamide], 2,2'-azobis[2-(2-imidazolin-2-yl) propane]dihydrochloride, 2,2'-azobis(2-methylpropionamidine)dihydrochloride, 2,2'-azobis{2-[1-(2-hydroxyethyl)-2-imidazolin-2-yl] propane}dihydrochloride, 2,2'-azobis(1-imino-1-pyrrolidino-2-ethylpropane)dihydrochloride, 2,2'-azobis{2-methyl-N-[1,1-bis(hydroxymethyl)-2-hydroxyethyl] propionamide}, 2,2'-azobis[2-methyl-N-(2-hydroxyethyl) propionamide], and combinations thereof. Redox initiators such as a combination of peroxygen compounds with a reducing agent such as sodium bisulfite, sodium metabisulfite, sodium dithionate, sodium formaldehyde sulfoxylate, or ascorbic acid can also be used. Particular combinations include sodium persulfate with sodium metabisulfite; hydrogen peroxide with ferrous ion, sulfite ion, bisulfite ion or ascorbic acid; hydroperoxides with sulfoxylates; and tert-butyl hydroperoxide with sodium formaldehyde sulfoxylate.

Further, a chain transfer agent, such as, for example, isopropanol, halogenated compounds, n-butyl mercaptan, n-amyl mercaptan, n-dodecyl mercaptan, t-dodecyl mercaptan, alkyl thioglycolate, mercaptopropionic acid, and alkyl mercaptoalkanoate in the amount of 0.01 to 6.0% by weight based on monomer weight may be used. Linear or branched $C_4$-$C_{22}$ alkyl mercaptans such as N-dodecyl mercaptan and t-dodecyl mercaptan are used in certain embodiments. Chain transfer agent(s) may be added in one or more additions or continuously.

Batch emulsion polymerization, continuous emulsion polymerization or semi-batch emulsion polymerization can be used to prepare the hybrid polymer emulsions of the present subject matter although semi-batch emulsion polymerization is used in many embodiments.

Polymerization can be performed at a wide range of temperatures such as from about 10° C. to about 100° C. In many embodiments, polymerization of the monomer mixture is performed at a temperature of about 80° C.

According to the present subject matter, the particle size and particle size distribution of the final hybrid emulsion depends on the initial seed particle size and its particle size distribution, monomer(s), surfactant(s) and initiator(s). Additionally, process parameters such as feeding rate/mode (i.e., continuous vs. shots, or, constant feeding rate vs. ramp-up feeding rate/ramp-down feeding rate, etc.) and polymerization temperature also have a significant impact on the particle size and particle size distribution of the final hybrid emulsion. The average particle sizes of the vinyl acetate-ethylene copolymer dispersion used to generate monomodal, bimodal, or multimodal particle size distribution of the final hybrid emulsion are preferably in the range of about 50 nm to about 4000 nm, more preferably in the range of about 100 nm to about 600 nm, and most preferably in the range of about 200 nm to 400 nm. The final hybrid emulsions having a monomodal distribution of particle sizes have average particle sizes preferably in the range of about 100 nm to about 1200 nm, more preferably in the range of about 200 nm to about 800 nm, and most preferably in the range of about 250 nm to 600 nm. The final hybrid emulsions having a bimodal or multimodal distribution of particle sizes have average particle sizes preferably in the range of about 100 nm to about 4000 nm, more preferably in the range of about 100 nm to about 1000 nm, and most preferably in the range of about 100 nm to 700 nm. In one embodiment, a multimodal particle size distribution in the final hybrid emulsion may be realized via at least one of two approaches. The first approach is by using an initial monomodal VAE seed as the first nucleating site then triggering a second nucleating site later during the polymerization by tuning the process parameters, for example, via the introduction of a shot of surfactant into the polymerizing mixture. The second approach is by using an initial multimodal VAE seed as the nucleating site followed by particle growth. The second approach may also include the triggering of additional nucleating sites via the introduction of a shot of surfactant into the polymerizing mixture. In both approaches, the final hybrid emulsion comprises a combination of particles that (1) include both VAE copolymers and (meth)acrylic polymers or copolymers, and/or optionally (2) particles that include only (meth)acrylic polymers or copolymers. In contrast, the prior art hybrid polymer emulsions generated via the physical blending of VAE dispersions and (meth)acrylic polymer or copolymer emulsions comprises a combination of particles that include (1) only VAE copolymers and (2) only (meth)acrylic polymers or copolymers.

In another embodiment, a monomodal particle size distribution in the final hybrid emulsion may be realized by using an initial monomodal VAE seed and carefully controlling the process parameters to prevent secondary nucleation of new particles. The final hybrid emulsion comprises particles that include both VAE copolymers and (meth)acrylic polymers or copolymers. In contrast, the prior art hybrid polymer emulsions produced via the physical blending of VAE dispersions and (meth)acrylic polymer or copolymer emulsions comprise a combination of particles that include (1) only VAE copolymers and (2) only meth(acrylic) polymers or copolymers.

The various hybrid polymer emulsions of the present subject matter can be utilized in adhesives and particularly, in pressure sensitive adhesive compositions. In particular embodiments, the present subject matter provides pressure sensitive adhesives which comprise the noted hybrid polymer emulsions and that exhibit one or more of the following characteristics or properties: (i) a 180° peel after a 15 minute dwell of from 1.0 to 3.2 lb/inch, and particularly from 1.5 to 3.2 lb/inch; (ii) a 180° peel after a 24 hour dwell of from 1.5 to 6.5 lb/inch, and particularly from 2.1 to 6.2 lb/inch; (iii) a loop tack of from 1.0 to 4.0 lb/inch, and particularly from 1.5 to 3.5 lb/inch; and (iv) shear time values of at least 50 minutes, and particularly at least 80 minutes.

The pressure sensitive adhesive (PSA) compositions of the hybrid emulsions according to this invention have a glass transition temperature (Tg) preferably in the range of about 20° C. to about −70° C., more preferably in the range of about 10° C. to about −60° C., and most preferably in the range of about 0° C. to about −50° C. The various hybrid emulsions of the present subject matter may be utilized in applications (other than pressure sensitive adhesive compositions) including, but not limited to, architecture coatings, industry coatings, specialty coatings, and graphics/arts coatings. These applications may require hybrid emulsions having Tgs that either include, overlap, or fall outside the range of the Tgs of the PSA compositions of the hybrid emulsions of the present subject matter. For example, architecture coatings typically have Tgs in the range of about −20° C. to about 50° C., industry coatings typically have Tgs in the range of about 0° C. to about 100° C., specialty coatings typically have Tgs in the range of about −20° C. to about 50° C., and graphics/arts coatings typically have Tgs in the range of about −40° C. to about 105° C. Therefore, the glass transition temperature (Tg) of the hybrid emulsion according to this invention may be adjusted to suit the desired application.

Additionally, the PSA compositions of the hybrid emulsion of this application may be characterized by their gel % content and molecular weight. The gel % content is preferably in the range of about 5% to about 85%, more preferably in the range of about 10% to about 70%, and most preferably in the range of about 20% to about 60%. The number average molecular weight (Mn) is preferably in the range of about 10,000 to about 150,000, more preferably in the range of about 15,000 to about 120,000, and most preferably in the range of about 20,000 to about 100,000. The weight average molecular weight (Mw) is preferably in the range of about 120,000 to about 450,000, more preferably in the range of about 150,000 to about 400,000, and most preferably in the range of about 200,000 to about 350,000.

Details of the characteristics or properties of the PSA compositions of this application and the method of measurement are provided herein.

By way of example and without intending to limit the scope of the present subject matter, the following examples will further illustrate the subject matter.

Example 1

Figure 4:
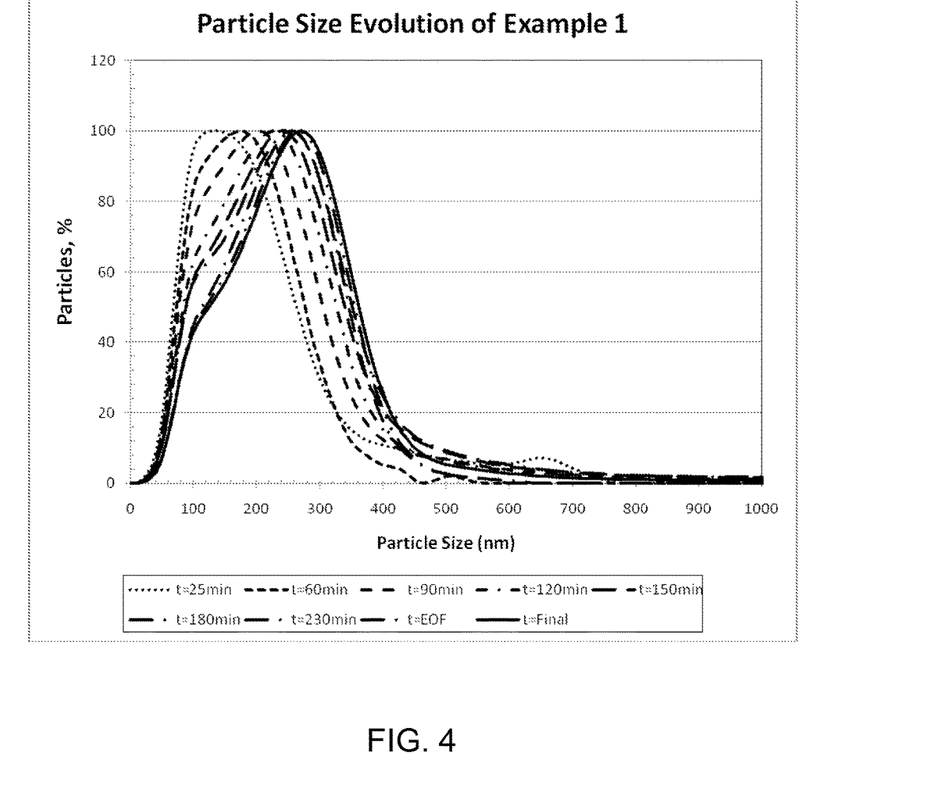
FIG. 4 is a graph of particle size distribution as a function of reaction time of the hybrid polymer emulsion of Example 1. EOF stands for End of Feed.

In a glass reactor equipped with a reflux condenser, a thermocouple, a pre-emulsion inlet tube, an initiator delay inlet tube and a pitched turbine agitator, there was charged 284.7 grams of a vinyl acetate-ethylene copolymer dispersion, VINNAPAS® EF 575 (20% by weight of the total polymer weight), and 164.2 grams of deionized water. A monomer mix consisting of 554.1 grams of butyl acrylate, 8.9 grams of methacrylic acid, 3.8 grams of acrylic acid, 63.0 grams of vinyl acetate and 1.6 grams of 1,4-butanediol dimethacrylate was added to 129.9 grams of deionized water containing 1.5 grams of tetrasodium pyrophosphate, 21.9 grams of DISPONIL FES-77, 8.1 grams of AEROSOL A-102 and 0.8 grams of AEROSOL OT-75 to make a pre-emulsion. The reactor charge was heated to 80° C., to which was added 1.9 grams of ammonium persulfate in 6.8 grams of deionized water. After 10 minutes the pre-emulsion was added to the reactor over a period of 230 minutes. Twenty-five (25) minutes after the start of the pre-emulsion, an initiator delay solution of 1.3 grams of ammonium persulfate in 118.4 grams of deionized water was introduced into the reactor for a period of 230 minutes. Fifteen (15)

minutes after the initiator solution ended, 5.0 grams of 19% ammonia was added to the reactor over 10 minutes. After that, the reactor was maintained at 80° C. for 90 minutes. Then, the contents were cooled to ambient temperature and discharged. The hybrid polymer emulsion had 57.2% solids, a pH of 5.8 and a Brookfield viscosity of 270 centipoise (cps). FIG. 4 illustrates particle size evolution and profile of a hybrid polymer emulsion of Example 1. The pre-emulsion feed starts at t=0 minutes.

Example 2

In a glass reactor equipped with a reflux condenser, a thermocouple, a pre-emulsion inlet tube, an initiator delay inlet tube and a pitched turbine agitator, there was charged 690.4 grams of a vinyl acetate-ethylene copolymer dispersion, VINNAPAS® EF 539 (50% by weight of the total polymer weight), and 92.7 grams of deionized water. A monomer mix consisting of 370.9 grams of butyl acrylate, 5.5 grams of methacrylic acid, 2.3 grams of acrylic acid, 1.0 grams of 1,4-butanediol dimethacrylate and 0.1 grams of n-dodecyl mercaptan was added to 63.7 grams of deionized water containing 1.2 grams of tetrasodium pyrophosphate, 13.3 grams of DISPONIL FES-77, 4.9 grams of AEROSOL A-102 and 0.5 grams of AEROSOL OT-75 to make a pre-emulsion. The reactor charge was heated to 80° C., to which was added 1.3 grams of ammonium persulfate in 6.7 grams of deionized water. After 10 minutes the pre-emulsion was added to the reactor over a period of 230 minutes. Twenty-five (25) minutes after the start of the pre-emulsion, an initiator delay solution of 0.9 grams of ammonium persulfate in 116.2 grams of deionized water was introduced into the reactor for a period of 230 minutes. Fifteen (15) minutes after the initiator solution ended, 5.0 grams of 19% ammonia was added to the reactor over 10 minutes. After that, the reactor was maintained at 80° C. for 90 minutes. Then, the contents were cooled to ambient temperature and discharged. The hybrid polymer emulsion had 55.2% solids, a pH of 6.8 and a Brookfield viscosity of 270 cps.

Figure 1:
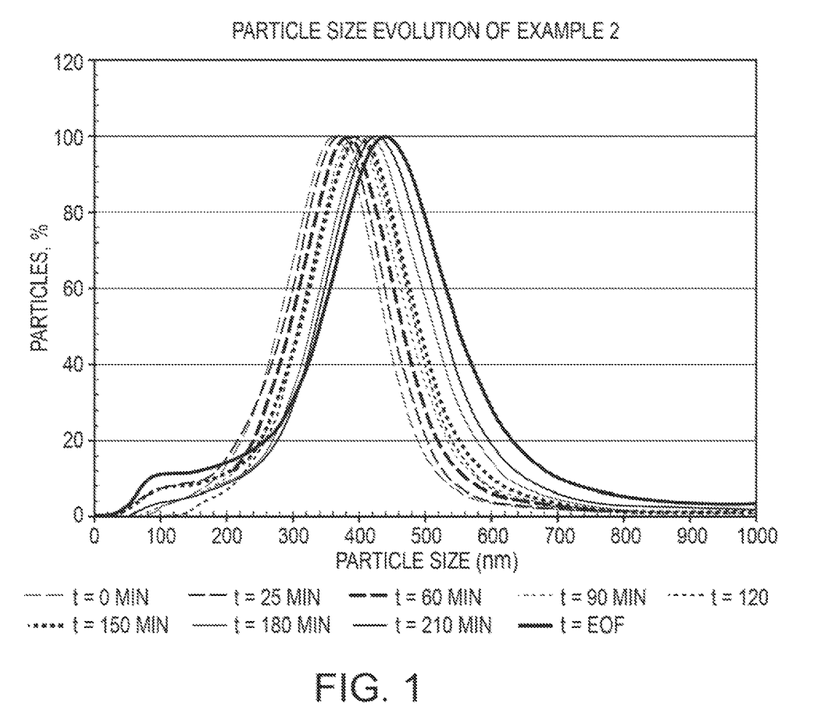
FIG. 1 is a graph of particle size distribution as a function of reaction time of the hybrid polymer emulsion of Example 2.

FIG. 1 illustrates particle size evolution and profile of a hybrid polymer emulsion of Example 2, without new particle formation as a function of reaction time resulting in a monomodal particle size distribution in the final hybrid polymer emulsion. The pre-emulsion feed starts at t=0 minutes. As used herein and throughout the disclosure, "new particles" are defined as the particles formed from secondary nucleation during the subsequent polymerization process resulting in a bimodal or multimodal particle size distribution in the final polymer emulsion while the secondary nucleation is defined as the nucleation of particles outside the initial seed particles.

Example 3

Figure 5:
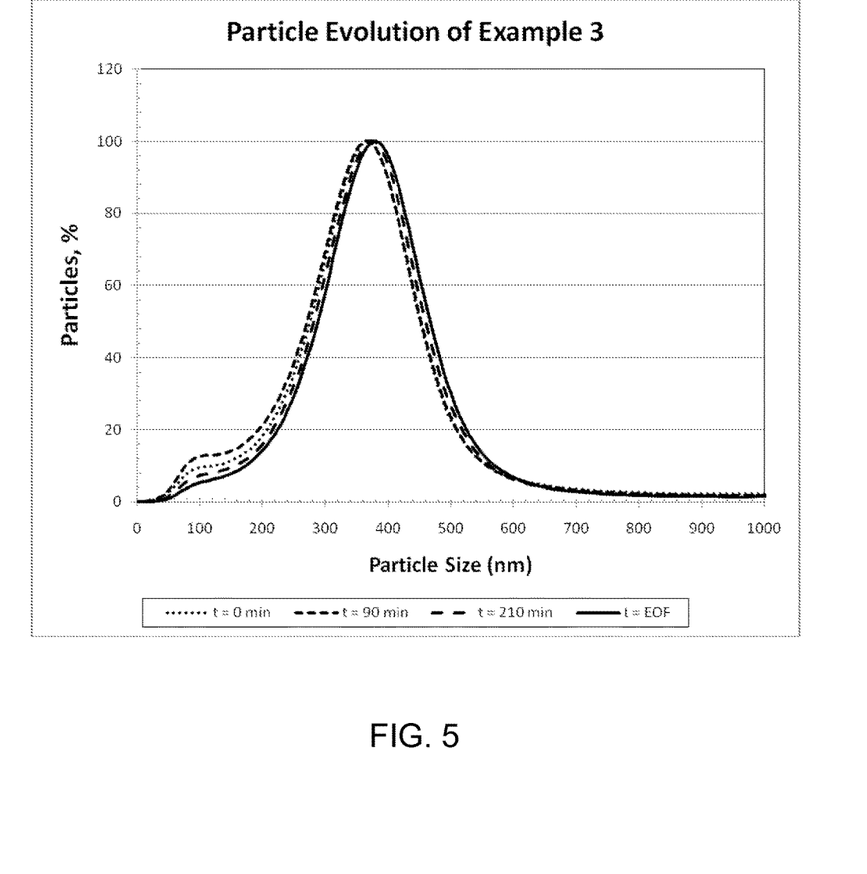
FIG. 5 is a graph of particle size distribution as a function of reaction time of the hybrid polymer emulsion of Example 3.

In a glass reactor equipped with a reflux condenser, a thermocouple, a pre-emulsion inlet tube, an initiator delay inlet tube and a pitched turbine agitator, there was charged 1042.9 grams of a vinyl acetate-ethylene copolymer dispersion, VINNAPAS® EF 539 (75% by weight of the total polymer weight). A monomer mix consisting of 186.7 grams of butyl acrylate, 2.8 grams of methacrylic acid, 1.2 grams of acrylic acid, 0.5 grams of 1,4-butanediol dimethacrylate and 0.1 grams of n-dodecyl mercaptan was added to 32.1 grams of deionized water containing 0.6 grams of tetrasodium pyrophosphate, 6.3 grams of DISPONIL FES-77, 2.3 grams of AEROSOL A-102 and 0.2 grams of AEROSOL OT-75 to make a pre-emulsion. The reactor charge was heated to 80° C., to which was added 0.7 grams of ammonium persulfate in 6.8 grams of deionized water. After 10 minutes the pre-emulsion was added to the reactor over a period of 230 minutes. Twenty-five (25) minutes after the start of the pre-emulsion, an initiator delay solution of 0.4 grams of ammonium persulfate in 102.4 grams of deionized water was introduced into the reactor for a period of 230 minutes. Fifteen (15) minutes after the initiator solution ended, 5.0 grams of 19% ammonia was added to the reactor over 10 minutes. After that, the reactor was maintained at 80° C. for 90 minutes. Then, the contents were cooled to ambient temperature and discharged. The hybrid polymer emulsion had 54.8% solids, a pH of 6.2 and a Brookfield viscosity of 640 cps. FIG. 5 illustrates particle size evolution and profile of a hybrid polymer emulsion of Example 3. The pre-emulsion feed starts at t=0 minutes.

Example 4

In a glass reactor equipped with a reflux condenser, a thermocouple, a pre-emulsion inlet tube, an initiator delay inlet tube and a pitched turbine agitator, there was charged 102.6 grams of a vinyl acetate-ethylene copolymer dispersion, VINNAPAS® EF 575 (7.5% by weight of the total polymer weight) and 287.4 grams of deionized water. A monomer mix consisting of 679.7 grams of butyl acrylate, 10.0 grams of methacrylic acid, 4.3 grams of acrylic acid, 1.8 grams of 1,4-butanediol dimethacrylate and 0.1 grams of n-dodecyl mercaptan was added to 116.8 grams of deionized water containing 2.1 grams of tetrasodium pyrophosphate, 29.3 grams of DISPONIL FES-77, 10.9 grams of AEROSOL A-102 and 1.0 grams of AEROSOL OT-75 to make a pre-emulsion. The reactor charge was heated to 80° C., to which was added 2.4 grams of ammonium persulfate in 6.7 grams of deionized water. After 10 minutes the pre-emulsion was added to the reactor over a period of 230 minutes. Twenty-five (25) minutes after the start of the pre-emulsion, an initiator delay solution of 1.6 grams of ammonium persulfate in 115.1 grams of deionized water was introduced into the reactor for a period of 230 minutes. Fifteen (15) minutes after the initiator solution ended, 4.9 grams of 19% ammonia was added to the reactor over 10 minutes. After that, the reactor was maintained at 80° C. for 90 minutes. Then, the contents were cooled to ambient temperature and discharged. The hybrid polymer emulsion had 55.6% solids, a pH of 6.3 and a Brookfield viscosity of 170 cps.

Figure 2:
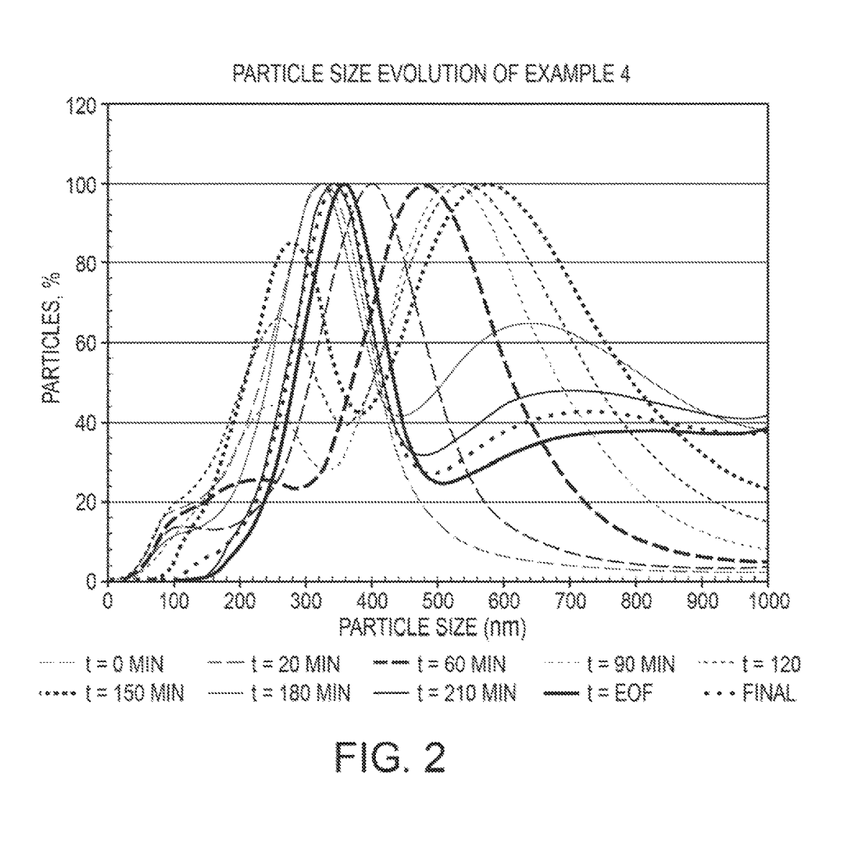
FIG. 2 is a graph of particle size distribution as a function of reaction time of the hybrid polymer emulsion of Example 4.
Figure 3:
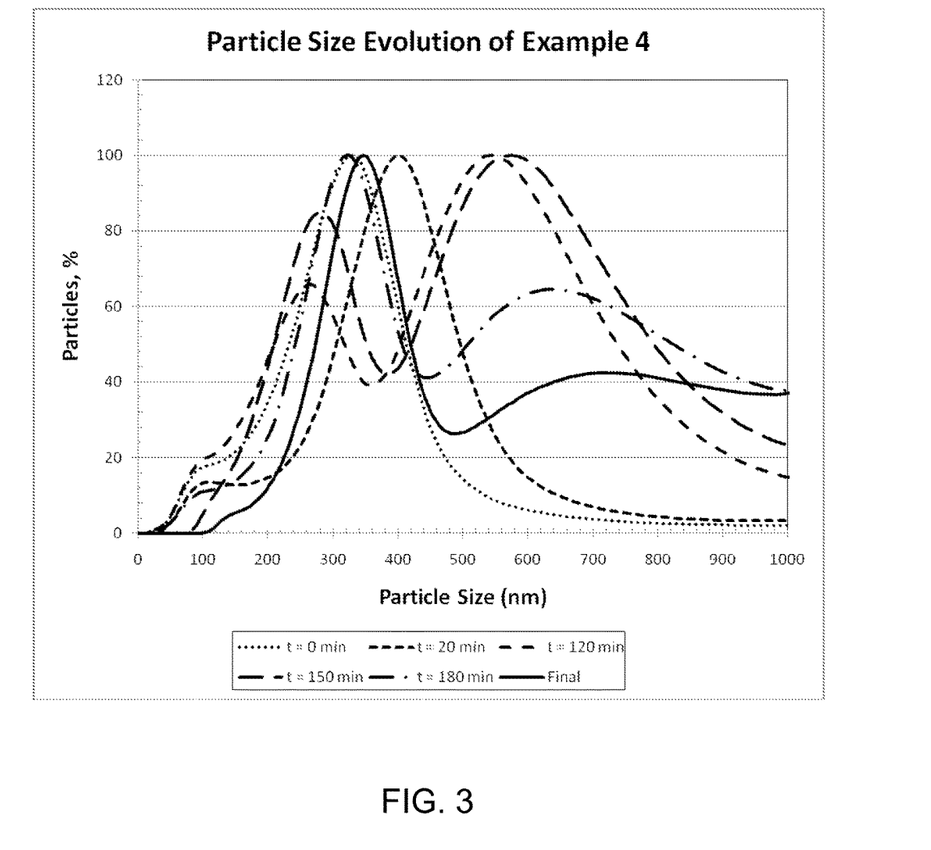
FIG. 3 is the same as FIG. 2 but with a reduced number of plots for clarity.

FIG. 2 illustrates particle size evolution and profile of another hybrid polymer emulsion of Example 4, with new particle formation observed resulting in a bimodal particle size distribution in the final hybrid polymer emulsion. The pre-emulsion feed starts at t=0 minute.

Example 5

In a glass reactor equipped with a reflux condenser, a thermocouple, a pre-emulsion inlet tube, an initiator delay inlet tube and a pitched turbine agitator, there was charged 1036.7 grams of a vinyl acetate-ethylene copolymer dispersion, VINNAPAS® EAF 68 (85% by weight of the total polymer weight) and 176.9 grams of deionized water. A monomer mix consisting of 96.3 grams of butyl acrylate, 1.6 grams of methacrylic acid, 0.7 grams of acrylic acid, 0.3 grams of 1,4-butanediol dimethacrylate and 11.0 grams of vinyl acetate was added to 18.1 grams of deionized water containing 0.3 grams of tetrasodium pyrophosphate, 3.5 grams of DISPONIL FES-77, 1.3 grams of AEROSOL A-102 and 0.1 grams of AEROSOL OT-75 to make a pre-emulsion. The reactor charge was heated to 80° C., to which was added 0.3 grams of ammonium persulfate in 4.8 grams of deionized water. After 10 minutes the pre-emulsion was added to the reactor over a period of 65 minutes. Twenty-five (25) minutes after the start of the pre-emulsion, an initiator delay solution of 0.2 grams of ammonium persulfate in 32.7 grams of deionized water was introduced into the reactor for a period of 65 minutes. Fifteen (15) minutes after the initiator solution ended, 2.3 grams of 19% ammonia was added to the reactor over 5 minutes. After that, the reactor was maintained at 85° C. for 90 minutes. Then, the contents were cooled to ambient temperature and discharged. The hybrid polymer emulsion had 52.7% solids, a pH of 4.4 and a Brookfield viscosity of 8100 cps.

The pressure sensitive adhesion performance of the hybrid polymer emulsions prepared in the Example 1, 2, 4 and 5 described herein is presented in Table 1 which consists of 180° peel adhesion, loop tack and shear performance.

TABLE 1

Performance of Hybrid Polymer Emulsions of Example 1, 2, 4, and 5

| Sample ID | 180° Peel, 15 minute dwell (lb/inch) | 180° Peel, 24 hour dwell (lb/inch) | Loop Tack (lb/inch) | Shear (minutes) |
|---|---|---|---|---|
| Example 1 | 2.0 | 2.2 | 2.5 | 345 |
| Example 2 | 1.5 | n/a* | 1.5 | 150 |
| Example 4 | 2.2 | 2.7 | 3.5 | 80 |
| Example 5** | 2.1 | 2.1 | 2.3 | ≥10000 |

*n/a = not measurable
**Coat weight is 40 grams per square meter instead

For each sample above, the hybrid polymer emulsion was directly coated onto 50 micron thick MYLAR® at a coat weight of 25 grams per square meter, then dried at 120° C. for 5 minutes. Peel values were measured at room temperature at 12 inch/minute crosshead speed after the specified dwell on stainless steel panels. Loop tack was measured on stainless steel panels according to PSTC-16. Shear values, i.e., time durations until failure, were measured at room temperature using ½ inch×½ inch samples with 500 gram weight using stainless steel panels. In all cases, the failure mode was cohesive split in the adhesives except for Example 5 where the test was stopped after 10,000 minutes without any failure in the adhesive.

Control

To 618.0 gram of OE-9145TV base polymer, added was 182.0 gram of Vinnapas® EF575 (20% by weight of the total polymer weight) and then the mixture was blended well under agitation for 30 minutes. The OE-9145TV base polymer is a commercial acrylic emulsion pressure sensitive adhesive polymer from Avery Dennison Performance Polymers Division. Typically, it has solids of 65.0%, a pH value of 7.3 and a Brookfield viscosity of 2000 cps.

Example 6

Figure 6:
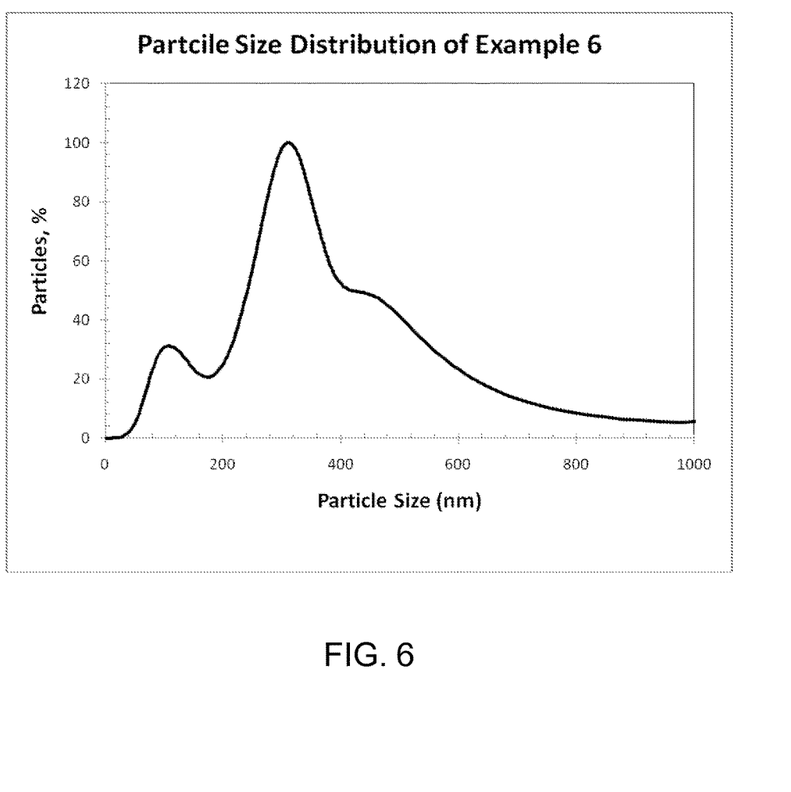
FIG. 6 is illustrates the particle size profile of the final hybrid polymer emulsion of Example 6.

In a glass reactor equipped with a reflux condenser, a thermocouple, a pre-emulsion inlet tube, an initiator delay inlet tube and a pitched turbine agitator, there was charged 299.1 grams of a vinyl acetate-ethylene copolymer dispersion, VINNAPAS® EF575 (20% by weight of the total polymer weight) and 208.1 grams of deionized water. A monomer mix consisting of 506.8 grams of 2-ethylhexyl acrylate, 35.8 grams of methyl methacrylate, 102.4 grams of methyl acrylate, 7.9 grams of styrene and 5.1 grams of acrylic acid was added to 95.6 grams of deionized water containing 29.1 grams of DISPONIL FES-77 and 4.3 grams of AEROSOL OT-75 to make a pre-emulsion. The reactor charge was heated to 78° C., to which was added 2.9 grams of potassium persulfate. After 5 minutes the pre-emulsion was added to the reactor over a period of 175 minutes. The polymerization temperature was maintained between 80 and 85° C. Twenty-five (25) minutes after the start of the pre-emulsion, an initiator delay solution of 1.7 grams of potassium persulfate in 76.0 grams of deionized water was introduced into the reactor for a period of 170 minutes. Fifteen (15) minutes after the pre-emulsion feed ended, 6.8 grams of 19% ammonia was added to the reactor and the batch was on hold for 30 minutes. After the 30 minute hold, a cook off catalyst solution of 0.2 grams of potassium persulfate in 8.9 grams of deionized water was fed into the reactor over a period of 20 minutes. The reactor was then maintained between 80 and 85° C. for 40 minutes. Then, the contents were cooled to ambient temperature and discharged. The hybrid polymer emulsion had 60.6% solids, a pH of 6.5 and a Brookfield viscosity of 2500 cps. FIG. 6 illustrates the particle size profile of the final hybrid polymer emulsion of Example 6.

Example 7

In a glass reactor equipped with a reflux condenser, a thermocouple, a pre-emulsion inlet tube, an initiator delay inlet tube and a pitched turbine agitator, there was charged 299.7 grams of a vinyl acetate-ethylene copolymer dispersion, VINNAPAS® EF539 (20% by weight of the total polymer weight) and 208.6 grams of deionized water. A monomer mix consisting of 507.9 grams of 2-ethylhexyl acrylate, 35.9 grams of methyl methacrylate, 102.6 grams of methyl acrylate, 7.9 grams of styrene and 5.1 grams of acrylic acid was added to 95.6 grams of deionized water containing 26.8 grams of DISPONIL FES-77 and 4.0 grams of AEROSOL OT-75 to make a pre-emulsion. The reactor charge was heated to 78° C., to which was added 2.9 grams of potassium persulfate. After 5 minutes the pre-emulsion was added to the reactor over a period of 175 minutes. The polymerization temperature was maintained between 80 and 85° C. Twenty-five (25) minutes after the start of the pre-emulsion, an initiator delay solution of 1.8 grams of potassium persulfate in 78.4 grams of deionized water was introduced into the reactor for a period of 170 minutes. Ten (10) minutes after the pre-emulsion feed ended, 6.8 grams of 19% ammonia was added to the reactor and the batch was on hold for 25 minutes. After the 25 minute hold, a cook off catalyst solution of 0.15 grams of potassium persulfate in 6.6 grams of deionized water was fed into the reactor over a period of 15 minutes. The reactor was then maintained between 80 and 85° C. for 30 minutes. Then, the contents were cooled to ambient temperature and discharged. The hybrid polymer emulsion had 60.2% solids, a pH of 6.5 and a Brookfield viscosity of 2300 cps.

Example 8

In a glass reactor equipped with a reflux condenser, a thermocouple, a pre-emulsion inlet tube, an initiator delay inlet tube and a pitched turbine agitator, there was charged 303.0 grams of a vinyl acetate-ethylene copolymer dispersion, VINNAPAS® EF575 (20% by weight of the total polymer weight) and 211.9 grams of deionized water. A monomer mix consisting of 512.5 grams of 2-ethylhexyl acrylate, 36.1 grams of methyl methacrylate, 103.5 grams of methyl acrylate, 8.0 grams of styrene and 6.4 grams of acrylic acid was added to 96.7 grams of deionized water containing 12.9 grams of DISPONIL FES-77 and 1.9 grams of AEROSOL OT-75 to make a pre-emulsion. The reactor charge was heated to 78° C., to which was added 2.9 grams of potassium persulfate. After 5 minutes the pre-emulsion was added to the reactor over a period of 175 minutes. The polymerization temperature was maintained between 80 and 85° C. Twenty-five (25) minutes after the start of the pre-emulsion, an initiator delay solution of 1.7 grams of potassium persulfate in 76.8 grams of deionized water was introduced into the reactor for a period of 170 minutes. Fifteen (15) minutes after the pre-emulsion feed ended, 6.8 grams of 19% ammonia was added to the reactor and the batch was on hold for 30 minutes. After the 30 minute hold, a cook off catalyst solution of 0.2 grams of potassium persulfate in 9.0 grams of deionized water was fed into the reactor over a period of 20 minutes. The reactor was then maintained between 80 and 85° C. for 40 minutes. Then, the contents were cooled to ambient temperature and discharged. The hybrid polymer emulsion had 60.1% solids, a pH of 6.3 and a Brookfield viscosity of 1450 cps.

Example 9

In a glass reactor equipped with a reflux condenser, a thermocouple, a pre-emulsion inlet tube, an initiator delay inlet tube and a pitched turbine agitator, there was charged 299.2 grams of a vinyl acetate-ethylene copolymer dispersion, VINNAPAS® EF575 (20% by weight of the total polymer weight), 6.1 grams of sodium bicarbonate and 208.2 grams of deionized water. A monomer mix consisting of 507.1 grams of 2-ethylhexyl acrylate, 35.8 grams of methyl methacrylate, 102.4 grams of methyl acrylate, 7.9 grams of styrene and 5.1 grams of acrylic acid was added to 95.6 grams of deionized water containing 29.1 grams of DISPONIL FES-77 and 4.4 grams of AEROSOL OT-75 to make a pre-emulsion. The reactor charge was heated to 78° C., to which was added 2.9 grams of potassium persulfate. After 5 minutes the pre-emulsion was added to the reactor over a period of 175 minutes. The polymerization temperature was maintained between 80 and 85° C. Twenty-five (25) minutes after the start of the pre-emulsion, an initiator delay solution of 1.7 grams of potassium persulfate in 76.0 grams of deionized water was introduced into the reactor for a period of 170 minutes. Fifteen (15) minutes after the pre-emulsion feed ended, the batch was on hold for 30 minutes. After the 30 minute hold, a cook off catalyst solution of 0.2 grams of potassium persulfate in 8.9 grams of deionized water was fed into the reactor over a period of 20 minutes. The reactor was then maintained between 80 and 85° C. for 40 minutes. Then, the contents were cooled to ambient temperature and discharged. The hybrid polymer emulsion had 60.4% solids, a pH of 5.4 and a Brookfield viscosity of 1500 cps.

The pressure sensitive adhesion performance of the hybrid polymer emulsions prepared in the Example 6-9 of described herein is compared with the Control prepared by the prior art of physical blending in Table 2 below which consists of 180° peel adhesion, loop tack and shear performance.

TABLE 2

Performance Comparison of Hybrid Polymer Emulsions with Its Counterpart by Physical Blending

| Sample ID | 180° Peel, 15 minute dwell (lb/inch) | 180° Peel, 24 Hour dwell (lb/inch) | Loop Tack (lb/inch) | Shear (minutes) |
| --- | --- | --- | --- | --- |
| Control | 2.7 | 3.0 | 3.7 | 215 |
| Example 6 | 2.6 | 5.0 | 3.6 | 262 |
| Example 7 | 2.6 | 2.6 | 2.8 | 140 |
| Example 8 | 3.2 | 6.2 | 2.8 | 320 |
| Example 9 | 1.6 | 2.6 | 1.7 | >10000 |

For each sample above, it was directly coated onto 50 micron thick MYLAR® at a coat weight of 22 grams per square meter, then dried at 93° C. for 7 minutes. Peel values were measured at room temperature at a crosshead speed of 12 inch/minute after the specified dwell on stainless steel panels. Loop tack was measured on stainless steel panels according to PSTC-16. Shear values, i.e., time durations until failure, were measured at room temperature using ½ inch×½ inch samples with 500 gram weight using stainless steel panels. In all cases, the failure mode was cohesive split in the adhesives except in Example 9 where the test was stopped after 10,000 minutes without any failure in the adhesive.

As can be seen in Table 2, the hybrid emulsions disclosed in this invention exhibit pressure sensitive adhesion performance advantages over the prior art of physical blending as exhibited in the Control. Significant efforts have been made over the decades to balance the adhesion-cohesion in waterborne pressure sensitive adhesives with few successes. Specifically, the conventional approaches are not sufficient to expand the "classical behavior" of a waterborne pressure sensitive adhesive where the adhesion performance is improved at the expense of cohesion, or vice versa.

In contrast, Example 6 and 8 described herein demonstrate that the present subject matter disclosed in this invention allows the extension of such "classical behavior" of a waterborne pressure sensitive adhesive with improvement in both adhesion and cohesion performance simultaneously. They all exhibit higher 24 hour peel adhesion and shear performance than the Control does.

On the other hand, Example 7 exhibits no peel adhesion buildup over a period of 24 hours compared with the Control prepared by the prior art of physical blending, which suggests it for removable applications where no peel adhesion buildup over time is desired.

In addition, Example 9 exhibits higher shear strength, i.e., cohesion, than the Control does. Therefore, it is suitable for applications where high cohesive strength of a pressure sensitive adhesive is desired.

Therefore, the hybrid emulsion of the present application overcomes the inherent incompatibility between a vinyl acetate-ethylene copolymer and an acrylic copolymer. It also allows us to incorporate more vinyl acetate-ethylene into acrylics, or vice versa, especially for those applications where clarity of the adhesive is required. For a physical blend of a vinyl acetate-ethylene copolymer and an acrylic copolymer, the final adhesive film usually turns hazy/cloudy when the a vinyl acetate-ethylene copolymer is loaded at 20% or higher of the total polymer weight. However, with the hybrid emulsion, the hybrid adhesive film looks clear at all loading levels of a vinyl acetate-ethylene copolymer from 7.5% to 85%. More importantly, it expands the performance window of an emulsion adhesive. As demonstrated in Examples 6 and 8, when compared with the Control made by the prior art (i.e., physical blending), the hybrid adhesives exhibit improvement in both adhesion and cohesion performance simultaneously; contrasting the "classical behavior" of an emulsion pressure sensitive adhesive where usually adhesion is improved at the expense of cohesion, or vice versa. In addition, physical blending usually produces a linear change in adhesive performance from high adhesion to lower adhesion. The performance of hybrid emulsions, however, as demonstrated in Example 6-9, may be tuned to cover a wider range of performance specifications and therefore, the adhesives may be utilized over a broader range of application options than physical blending. Additionally, the PSA compositions of the hybrid emulsion of this application may be characterized by their gel % content and molecular weight.

Additionally, the PSA compositions of the hybrid emulsion of this application may be characterized by their gel % content and molecular weight. For example, the gel % content, the number average molecular weight (Mn), and the weight average molecular weight (Mw) of the PSA of Example 6 are 39%, 41,000, and 216,000, respectively; the gel % content, the number average molecular weight (Mn), and the weight average molecular weight (Mw) of the PSA of Example 8 are 38%, 54,000, and 241,000, respectively; and the gel % content, the number average molecular weight (Mn), and the weight average molecular weight (Mw) of the PSA of Example 9 are 51%, 47,000, and 218,000, respectively.

Many other benefits will no doubt become apparent from future application and development of this technology.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. Particularly, it has expanded the performance window of a waterborne pressure sensitive adhesive with simultaneous improvement in both adhesion and cohesion, in contrast to the "classical behavior" of a waterborne pressure sensitive adhesive where usually adhesion performance is improved at the expense of cohesion, or vice versa. In addition, it also allows new applications, including but not limited to, those where no peel adhesion buildup is desired or high cohesive strength is required.

However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A polymer emulsion comprising:
   particles comprising both a vinyl acetate-ethylene (VAE) copolymer and a (meth)acrylic polymer or copolymer, wherein the (meth)acrylic polymer or copolymer is prepared in situ by polymerization and/or copolymerization of a (meth)acrylic monomer mixture, and
   wherein the polymer emulsion has a monomodal particle size distribution.

2. The polymer emulsion of claim 1 wherein the vinyl acetate-ethylene copolymer comprises from about 0.05% to about 95% by weight of the total polymer weight.

3. The polymer emulsion of claim 1 wherein the vinyl acetate-ethylene copolymer comprises at least 10% by weight of the total polymer weight.

4. The polymer emulsion of claim 1 wherein the vinyl acetate-ethylene copolymer comprises at least 20% by weight of the total polymer weight.

5. The polymer emulsion of claim 1 wherein the vinyl acetate-ethylene copolymer comprises at least 50% by weight of the total polymer weight.

6. The polymer emulsion of claim 1 wherein the vinyl acetate-ethylene copolymer comprises at least 75% by weight of the total polymer weight.

7. The polymer emulsion of claim 1 wherein the vinyl acetate-ethylene copolymer comprises at least 85% by weight of the total polymer weight.

8. The polymer emulsion of claim 1 wherein the monomer mixture comprises at least 5% by weight of the total polymer weight.

9. The polymer emulsion of claim 1 wherein the monomer mixture comprises one or more monomers selected from the group consisting of methyl acrylate, methyl methacrylate, ethyl acrylate, ethyl methacrylate, butyl acrylate, butyl methacrylate, propyl acrylate, propyl methacrylate, 2-ethylhexyl acrylate, 2-ethylhexyl methacrylate, lauryl acrylate, lauryl methacrylate, iso-octyl acrylate, iso-octyl methacrylate, iso-decyl acrylate, iso-decyl methacrylate, stearyl acrylate, stearyl methacrylate, vinyl propionate, styrene, alkyl-substituted styrenes, vinyl acetate, vinyl chloride, N-vinyl pyrrolidone, and combinations thereof.

10. The polymer emulsion of claim 1 wherein the monomer mixture comprises butyl acrylate.

11. The polymer emulsion of claim 1 wherein the monomer mixture comprises 2-ethylhexyl acrylate.

12. The polymer emulsion of claim 1 wherein the monomer mixture further comprises a polar monomer selected from the group consisting of acrylic acid, methacrylic acid, crotonic acid, itaconic acid, fumaric acid, maleic acid, maleic anhydride, hydroxyethyl methacrylate, hydroxyethyl acrylate, aminomethyl methacrylate, N-methyl aminoethyl methacrylate, N,N-dimethyl aminoethyl methacrylate, ureido methacrylate, acrylonitrile, methacrylonitrile, acrylamide, methacrylamide, and combinations thereof.

13. The polymer emulsion of claim 12 wherein the polar monomer is methacrylic acid.

14. The polymer emulsion of claim 12 wherein the polar monomer is acrylic acid.

15. The polymer emulsion of claim 1 wherein the monomer mixture further comprises an internal cross-linking agent.

16. The polymer emulsion of claim 15 wherein the internal cross-linking agent is selected from the group consisting of 1,4-butanediol dimethacrylate, polyethylene glycol diacrylate, 1,6-hexanediol diacrylate, allyl methacrylate, trimethylolpropane triacrylate, trimethylolpropane trimethacrylate, propylene glycol diacrylate, diallyl maleate, diallyl phthalate, and combinations thereof.

17. The polymer emulsion of claim 1 wherein the monomer mixture comprises a chain transfer agent.

18. The polymer emulsion of claim 1 wherein the monomer mixture is combined with a surfactant prior to polymerization.

19. The polymer emulsion of claim 1 wherein the monomer mixture is combined with an initiator prior to polymerization.

20. The polymer emulsion of claim 19 wherein the initiator is selected from the group consisting of ammonium persulfate, potassium persulfate, sodium persulfate, hydrogen peroxide, tert-butyl hydroperoxide, benzoyl peroxide, lauroyl peroxide, sodium persulfate with sodium metabisulfite, hydrogen peroxide with ferrous ion, sulfite ion, bisulfite ion or ascorbic acid, hydroperoxides with sulfoxylates, tert-butyl hydroperoxide with sodium formaldehyde sulfoxylate, and combinations thereof.

21. The polymer emulsion of claim 20 wherein the initiator is a persulfate.

22. The polymer emulsion of claim 19 wherein the initiator is selected from the group consisting of 2,2'-azobis-(2,4-dimethylvaleronitrile), 2,2'-azobis-(2-isobutyronitrile), 1,1'-azobis(cyclohexane-1-carbonitrile), 2,2'-azobis(4-methoxy-2,4-dimethyl valeronitrile), 2,2-azobis[N-(2-propenyl)-2-methylpropionamide], 2,2'-azobis[2-(2-imidazolin-2-yl)propane]dihydrochloride, 2,2'-azobis(2-methylpropionamidine)dihydrochloride, 2,2'-azobis{2-[1-(2-hydroxyethyl)-2-imidazolin-2-yl]propane}dihydrochloride, 2,2'-azobis(1-imino-1-pyrrolidino-2-ethylpropane)dihydrochloride, 2,2'-azobis{2-methyl-N-[1,1-bis(hydroxymethyl)-2-hydroxyethyl] propionamide}, 2,2'-azobis[2-methyl-N-(2-hydroxyethyl) propionamide], and combinations thereof.

23. The polymer emulsion of claim 1 wherein the polymer is prepared by polymerizing the (meth)acrylic monomer mixture at a temperature between about 10° C. and about 100° C.

24. The polymer emulsion of claim 1 wherein the polymerization temperature of the monomer mixture is about 80° C.

25. The polymer emulsion of claim 1 wherein an average particle size of the vinyl acetate-ethylene copolymer dispersion is in the range of from about 50 nm to about 4000 nm.

26. The polymer emulsion of claim 1 wherein the polymer emulsion has an average particle size in the range of about 100 nm to about 4000 nm.

27. A process for producing a polymer emulsion comprising:
providing a vinyl acetate-ethylene copolymer dispersion as a seed;
providing a monomer feed;
providing an initiator;
combining the vinyl acetate-ethylene copolymer dispersion, the monomer feed, and the initiator to produce the polymer emulsion comprising a combination of particles that comprise particles comprising both a vinyl acetate-ethylene (VAE) copolymer and a (meth)acrylic polymer or copolymer,
wherein the polymer emulsion has a monomodal particle size distribution.

28. The process of claim 27 wherein the vinyl acetate-ethylene copolymer comprises from about 0.05% to about 95% by weight of the total polymer weight.

29. The process of claim 27 wherein the vinyl acetate-ethylene copolymer comprises at least 10% by weight of the total polymer weight.

30. The process of claim 27 wherein the vinyl acetate-ethylene copolymer comprises at least 20% by weight of the total polymer weight.

31. The process of claim 27 wherein the vinyl acetate-ethylene copolymer comprises at least 50% by weight of the total polymer weight.

32. The process of claim 27 wherein the vinyl acetate-ethylene copolymer comprises at least 75% by weight of the total polymer weight.

33. The process of claim 27 wherein the vinyl acetate-ethylene copolymer comprises at least 85% by weight of the total polymer weight.

34. The process of claim 27 wherein the monomer feed comprises a monomer mixture comprising at least 5% by weight of the total polymer weight.

35. The process of claim 27 wherein the monomer feed and the initiator are concurrently combined.

36. The process of claim 27 wherein the monomer feed further comprises deionized water.

37. The process of claim 27 wherein the monomer feed further comprises a surfactant.

38. The process of claim 37 wherein the surfactant is an anionic surfactant.

39. The process of claim 27 wherein the monomer mixture comprises one or more monomers selected from the group consisting of methyl acrylate, methyl methacrylate, ethyl acrylate, ethyl methacrylate, butyl acrylate, butyl methacrylate, propyl acrylate, propyl methacrylate, 2-ethylhexyl acrylate, 2-ethylhexyl methacrylate, lauryl acrylate, lauryl methacrylate, iso-octyl acrylate, iso-octyl methacrylate, iso-decyl acrylate, iso-decyl methacrylate, stearyl acrylate, stearyl methacrylate, vinyl propionate, styrene, alkyl-substituted styrenes, vinyl acetate, vinyl chloride, N-vinyl pyrrolidone, and combinations thereof.

40. The process of claim 39 wherein the monomer mixture comprises butyl acrylate.

41. The process of claim 39 wherein the monomer mixture comprises 2-ethylhexyl acrylate.

42. The process of claim 27 wherein the monomer mixture comprises a polar monomer selected from the group consisting of acrylic acid, methacrylic acid, crotonic acid, itaconic acid, fumaric acid, maleic acid, maleic anhydride, hydroxyethyl methacrylate, hydroxyethyl acrylate, aminomethyl methacrylate, N-methyl aminoethyl methacrylate, N,N-dimethyl aminoethyl methacrylate, ureido methacrylate, acrylonitrile, methacrylonitrile, acrylamide, methacrylamide, and combinations thereof.

43. The process of claim 42 wherein the polar monomer is methacrylic acid.

44. The process of claim 42 wherein the polar monomer is acrylic acid.

45. The process of claim 27 wherein the monomer mixture comprises an internal cross-linking agent.

46. The process of claim 45 wherein the internal cross-linking agent is selected from the group consisting of 1,4-butanediol dimethacrylate, polyethylene glycol diacrylate, 1,6-hexanediol diacrylate, allyl methacrylate, trimethylolpropane triacrylate, trimethylolpropane trimethacrylate, propylene glycol diacrylate, diallyl maleate, diallyl phthalate, and combinations thereof.

47. The process of claim 27 wherein the monomer mixture comprises a chain transfer agent.

48. The process of claim 27 wherein the monomer mixture is combined with a surfactant prior to polymerization.

49. The process of claim 27 wherein the monomer feed is combined with an initiator prior to polymerization.

50. The process of claim 49 wherein the initiator is selected from the group consisting of ammonium persulfate, potassium persulfate, sodium persulfate, hydrogen peroxide, tert-butyl hydroperoxide, benzoyl peroxide, lauroyl peroxide, sodium persulfate with sodium metabisulfite, hydrogen peroxide with ferrous ion, sulfite ion, bisulfite ion or ascorbic acid, hydroperoxides with sulfoxylates, tert-butyl hydroperoxide with sodium formaldehyde sulfoxylate, and combinations thereof.

51. The process of claim 50 wherein the initiator is a persulfate.

52. The process of claim 50 wherein the initiator is selected from the group consisting of 2,2'-azobis-(2,4-dimethylvaleronitrile), 2,2'-azobis-(2-isobutyronitrile), 1,1'-azobis(cyclohexane-1-carbonitrile), 2,2'-azobis(4-methoxy-2,4-dimethyl valeronitrile), 2,2-azobis[N-(2-propenyl)-2-methylpropionamide], 2,2'-azobis[2-(2-imidazolin-2-yl)propane]dihydrochloride, 2,2'-azobis(2-methylpropionamidine)dihydrochloride, 2,2'-azobis{2-[1-(2-hydroxyethyl)-2-imidazolin-2-yl]propane}dihydrochloride, 2,2'-azobis(1-imino-1-pyrrolidino-2-ethylpropane)dihydrochloride, 2,2'-azobis{2-methyl-N-[1,1-bis(hydroxymethyl)-2-hydroxyethyl]propionamide}, 2,2'-azobis[2-methyl-N-(2-hydroxyethyl)propionamide], and combinations thereof.

53. The process of claim 27 wherein the monomer feed is polymerized at a temperature between about 10° C. and about 100° C.

54. The process of claim 27 wherein the monomer feed is polymerized at a temperature of about 80° C.

55. A polymer emulsion produced by the process of claim 27.

56. An emulsion pressure sensitive adhesive prepared by the process of claim 27.

57. A pressure sensitive adhesive comprising;
a polymer emulsion comprising a combination of particles that comprise (1) particles comprising both a vinyl acetate-ethylene (VAE) copolymer and a (meth)acrylic polymer or copolymer, or (2) particles comprising both a vinyl acetate-ethylene (VAE) copolymer and a (meth)acrylic polymer or copolymer and particles that comprise only a (meth)acrylic polymer or copolymer,
wherein the (meth)acrylic polymer or copolymer is prepared by polymerization and/or copolymerization of a (meth)acrylic monomer mixture,
wherein the pressure sensitive adhesive has a glass transition temperature of about 10° C. to about −60° C.

58. The pressure sensitive adhesive of claim 57 having a glass transition temperature (Tg) in the range of about 0° C. to about −50° C.

59. The pressure sensitive adhesive of claim 57 having a gel % content in the range of about 5% to about 85%.

60. The pressure sensitive adhesive of claim 57 having a weight average molecular weight (Mw) in the range of about 120,000 to about 450,000.

61. The polymer emulsion of claim 1, wherein the ethylene content ranges between 5-40% of the VAE copolymer.

62. The pressure sensitive adhesive of claim 57, wherein the (meth)acrylic polymer or copolymer is prepared in situ by polymerization and/or copolymerization of a (meth)acrylic monomer mixture.

63. A polymer emulsion comprising:
a combination of particles that comprise particles comprising both a vinyl acetate-ethylene (VAE) copolymer and a (meth)acrylic polymer or copolymer and particles comprising only a (meth)acrylic polymer or copolymer,
wherein the (meth)acrylic polymer or copolymer is prepared in situ by polymerization and/or copolymerization of a (meth)acrylic monomer mixture, and
wherein the polymer emulsion has a multimodal particle size distribution.

64. A process for producing a polymer emulsion comprising:
providing a vinyl acetate-ethylene copolymer dispersion as a seed;
providing a monomer feed;
providing an initiator;
combining the vinyl acetate-ethylene copolymer dispersion, the monomer feed, and the initiator to produce the polymer emulsion comprising a combination of particles that comprise particles comprising both a vinyl acetate-ethylene (VAE) copolymer and a (meth)acrylic polymer or copolymer and particles that comprise only a (meth)acrylic polymer or copolymer,
wherein the polymer emulsion has a multimodal particle size distribution.

\* \* \* \* \*